United States Patent [19]

Bogdanovi et al.

[11] Patent Number: 4,829,772

[45] Date of Patent: May 16, 1989

[54] METHOD OF AND DEVICE FOR STORING AND TRANSFORMING HEAT AND GENERATING COLD

[75] Inventors: Borislav Bogdanovi; Alfred Ritter; Bernd Spliethoff, all of Mülheim, Fed. Rep. of Germany

[73] Assignee: Studiengesellschaft Kohle mbH, Mulheim, Fed. Rep. of Germany

[21] Appl. No.: 121,330

[22] Filed: Nov. 16, 1987

[30] Foreign Application Priority Data

Nov. 20, 1986 [DE] Fed. Rep. of Germany ....... 3639545

[51] Int. Cl.⁴ .............................................. F17C 11/00
[52] U.S. Cl. .................................. 62/48.1; 165/104.12
[58] Field of Search ......................... 62/48; 165/104.12

[56] References Cited

U.S. PATENT DOCUMENTS

| | | | |
|---|---|---|---|
| 4,096,639 | 6/1978 | Sandrock | 62/48 |
| 4,161,211 | 7/1979 | Duffy et al. | 62/48 |
| 4,178,987 | 12/1979 | Bowman et al. | 62/48 |
| 4,214,699 | 7/1980 | Buchner et al. | 62/48 |
| 4,385,726 | 5/1983 | Bernauer et al. | 62/48 |
| 4,402,187 | 9/1983 | Golben et al. | 62/48 |
| 4,433,063 | 2/1984 | Bernstein et al. | 62/48 |
| 4,599,867 | 7/1986 | Retallick | 62/48 |

*Primary Examiner*—Ronald C. Capossela
*Attorney, Agent, or Firm*—Sprung Horn Kramer & Woods

[57] ABSTRACT

A method of storing and transforming heat and of generating cold by means of two metal-hydride and metal-hydrogen systems operating in conjunction in closed circulation at different temperatures. Magnesium hydride, especially active magnesium hydride, is employed as a high-temperature hydride. A hydride with a hydrogen-dissociation pressure that is lower than that of the magnesium hydride subject to the conditions of thermal dissociation and higher than that of the magnesium hydride during its recovery is employed as a low-temperature hydride.

12 Claims, 3 Drawing Sheets

METHOD OF AND DEVICE FOR STORING AND TRANSFORMING HEAT AND GENERATING COLD

BACKGROUND OF THE INVENTION

The present invention relates to a method of and a device for storing and transforming heat and for generating cold based on a combination of two reversible metal-hydride and metal-hydrogen systems that operate in conjunction—a magnesium-hydride and magnesium-hydrogen system (high-temperature hydride) and an appropriate low-temperature metal hydride and metal-hydrogen (low-temperature hydride) or magnesium-hydride and magnesium-hydrogen system—combined with a hydrogen reservoir.

Combinations of two metal-hydrid and metal-hydrogen systems that operate in conjunction in the capacity of heat pumps to increase the heat available at moderate temperatures, to raise heat to higher temperature graduations, or for refrigeration (refrigeration and air conditioning) are known (H. Buchner in "Energiespeicherung in Metallhydriden," Springer, pp. 29-31 and 223-33; M. Ron and Y. Josephy, Zeitschrift für Physikalische Chemie, Neue Folge 147, 241 [1986], D. M. Gruen et al, Proc. 1st World Energy Conf., Miami Beach, Fla., March 1976, Vol. 2, Paper 88, p. 73; D. M. Gruen, German OS No. 2 633 974, 1977; Gruen et al, Adv. Hydrogen Energy 4, 1931 [1979]; J. Less Common Metals 74, 401 [1980]; and R. Gorman & P. Moritz, Hydride Heat Pump. Vol. II: Cost, Performance, and Cost Effectiveness, Argonne National Laboratory Contract No. 31-109-38-4001).

The aforesaid metal-hydride systems, which are what are called low-temperature metal-hydride systems, are characterized by the following features:

low reaction enthalpies ($\Delta H$ on the order of magnitude of 30 kJ/mol $H_2$) and low heat-storage capacities, low hydrogen-storage capacities (1-2% by weight), high hydrogen-dissociation pressures (which makes the systems appropriate for use in heat reservoirs or heat pumps that operate at moderate temperatures, in heating and air conditioning for example), relatively high price, satisfactory to outstanding kinetics in relation to the hydrogenation and dehydrogenation process, high hysteresis, with the exception of particular La-Ni-Al and Mn-Ni-Fe systems, add fairly indefinite horizontal hydride-phase plateaus in the concentration-pressure-isotherm (CPI) diagram, with the exception of particular La-Ni-Al and Mn-Ni-Fe systems.

There has existed up to the present time no technical solution for hydride heat reservoirs or pumps provided with one or more of the following functions: effective and no-loss storage of high-temperature heat in the range of 250° to 500° C., for which there is an urgent technical need, to power Stirling engines (H. D. Heck, Bild der Wissenschaft, Nov. 1985, p. 126 and H. Kleinwächter, Energie 35, 221 [1983]) or other heat-energy machines and for solar boilers for instance, storage of such high-temperature heat (250°-500° C.) as solar heat for example in combination with the generation of cold so that for instance solar heat reservoirs or solar boilers can simultaneously function as refrigerators in sunny climates (desalinization of sea water to make ice), and storage of high-temperature heat with the potential at the range of 250° to 500° C. for raising the heat to higher temperature graduations, and the exploitation of waste industrial heat or solar heat by means of heat transformation.

No technical solution to these problems by means of conventional heat reservoirs or pumps, which operate on the principle of sensible or latent heat, is presently known. The use of high-temperature hydrides for storing and transforming heat with magnesium hydride or intermetallic hydrides based on magnesium, such as $Mg_2NiH_4$ for instance, has not as yet been proven, and its practicality is in fact dubious (S. Ono, Solar Hydrogen Energy Systems, Oxford, Pergamon, 202 [1979]), whereas its kinetics and technical applicability have been termed unsatisfactory (W. Rummel, Siemens Forsch.-Entwicklungsber. 7, 1, 44 [1978]).

It has, however, been discovered that, surprisingly, combinations of magnesium hydride and magnesium systems, especially what are called "active $MgH_2$-Mg systems," either with specially selected low-temperature metal-hydride and metal systems or with a hydrogen reservoir if necessary, are outstandingly appropriate as heat reservoirs and heat pumps and that composite systems of that type allow technical realization of the aforesaid objectives.

Magnesium-hydride and magnesium systems in the sense of the present method are those obtainable by hydrogenating magnesium powder with a particle size of 270 mesh or less or magnesium alloyed with 5 to 10% by weight nickel. The "active $MgH_2$-Mg systems" in the sense of the present method can be obtained by the following processes:

catalytic hydrogenation of magnesium subject to gentle conditions as described in European Patent No. 3564 (1979) or in German OS No. 3 410 640 (1985), doping magnesium powder or magnesium hydride with small amounts of transition metals, especially nickel, as described in U.S. Pat. No. 4,554,152 (1985), treating magnesium powder with small amounts of transition-metal salts in the presence of catalytic amounts of anthracene as described in U.S. application Ser. No. 933,454, filed Nov. 21, 1986, now U.S. Pat No. 4,713,110 , (corresponding to German Patent Application No. P 3 541 633.5), or doping magnesium powder with small amounts of transition metals, especially nickel, by grinding a mixture of the two constituents in solid form or in an organic solvent as described in European Patent Application EP-A No. 0 112 548.

Among the advantages of the "active $MgH_2$-Mg systems" as heat-reservoir systems are high reaction enthalpy on the part of the magnesium with hydrogen—75 kJ/mol $H_2$, which is approximately ⅓ of the combustion heat of hydrogen and an accordingly high hydrogen-storage capacity on the part of the $MgH_2$-Mg system—0.9 kW-hr/kg Mg or 0.8 kW-hr/kg $MgH_2$ (as against 0.1 kW-hr/kg for conventional salt-hydrate reservoirs), high hydrogen-storage capacities (7-7.6% by weight), low price, the kinetics of the $MgH_2$-Mg systems, especially those of the "active $MgH_2$-Mg systems," which allow charging with hydrogen at low hydrogen pressures (2-3 bars or less), which is of decisive significance for simultaneous heat recovery and cold generation), the absence of hysteresis and the almost horizontal plateau in the CPI diagram, and beneficial operating temperature in relation to the storage of high-temperature heat in the 250° to 500° C. range, which can be selected by dictating the hydrogen pressure (with 1 bar corresponding to 284° C. and 150 bars to 527° C.).

Appropriate low-temperature metal-hydride and metal systems in the sense of the present method are those with a hydrogen-dissociation pressure that is lower subject to the conditions of thermal dissociation on the part of the magnesium hydride and higher during its restoration than that of the magnesium hydride. Among the appropriate systems are iron-titanium hydride systems or hydrides of alloys of the metals titanium, zirconium, vanadium, iron, chromium, and manganese, such as for example the alloy $Ti_{0.98} Zr_{0.02} V_{0.43} Fe_{0.09} Cr_{0.05} Mn_{1.5}$ and hydrides of intermetallic compounds of the type $LaNi_{5-x}Al_x$ with $MmNi_{5-x}Fe_x$ with $0 \leq x \leq 1.0$ (wherein Mm is Mischmetall).

The device for storing and transforming heat and for generating cold in accordance with the present invention consists in the simplest case of a container (high-temperature reservoir) containing magnesium hydride or magnesium that communicates through a shut-off valve with a container (low-temperature reservoir) containing a low-temperature alloy or low-temperature hydride such that hydrogen can flow in both directions when the valve is open.

At the beginning of every heat-storage cycle the high-temperature reservoir is charged with hydrogen (in the form of magnesium hydride) whereas the low-temperature reservoir is left uncharged (containing the pure alloy). The process of heat storage consists of supplying heat to the high-temperature reservoir at a temperature $T_2$ at which the hydrogen-dissociation pressure of the magnesium hydride is higher than that of the low-temperature hydride at the temperature $T_1$ of the low-temperature reservoir, leading to dissociation of the magnesium hydride and to hydrogen flowing into the low-temperature reservoir, where it is absorbed by the low-temperature alloy. A quantity $Q_2$ of heat equaling 75 kJ/mol $MgH_2$ must be supplied to the high-temperature reservoir at temperature $T_2$ for the magnesium hydride to dissociate, given the dissociation enthalpy of the magnesium hydride, whereas simultaneously a quantity $Q_1$ of heat, corresponding to the hydrogenation heat of the alloy, must be removed from the low-temperature reservoir for every mole of hydrogen absorbed at temperature $T_1$. It is simultaneously important for the quantity $Q_1$ of heat released while the low-temperature hydride forms during heat storage to be generally 2 to 3 times lower than the heat of dissociation ($Q_2$) of the magnesium hydride. The quantity $Q_1$ of heat generated by the low-temperature reservoir at temperature $T_1$ (e.g. room temperature) is either exploited in the form of low-temperature heat, released into the environment, or removed in some other way.

With the iron-titanium combination as an example of a low-temperature alloy the heat-storage process can be represented by the equations $$MgH_2 + 75 \text{ kJ/mol} \rightarrow Mg + H_2$$

and $$FeTi + H_2 \rightarrow FeTiH_2 + 28 \text{ kJ/mol}.$$

In contrast to heat reservoirs that operate on the basis of latent heat, the heat that is "chemically stored" in this way (with the shut-off valve closed) can be stored for as long as desired with no loss.

The process of recovering the stored heat is initiated by opening the shut-off valve to allow hydrogen to flow from the low-temperature reservoir to the high-temperature reservoir. The flow of hydrogen in either direction can be exploited to generate mechanical energy, to drive a turbine for example. A quantity $Q_1 = 28$ kJ/mol of heat sufficient to dissociate the low-temperature hydride must be supplied to the low-temperature reservoir during heat recovery while the quantity $Q_2 = 75$ kJ/mol of heat generated by the formation of the magnesium hydride at the high-temperature reservoir end is released.

When an iron-titanium hydride is employed as the low-temperature hydride, the process of heat recovery can be represented by the equations $$FeTiH_2 + 28 \text{ kJ/mol} \rightarrow FeTi + H_2$$

and $$Mg + H_2 \rightarrow MgH_2 + 75 \text{ kJ/mol}.$$

The quantity $Q_1$ of heat required to dissociate the low-temperature hydride at the low-temperature reservoir end can be obtained from the environment or from a heat accumulaton, generating a cooling action that can be exploited for refrigeration. If for example quantity $Q_1$ of heat is obtained from the air inside a building, the cooling action can be exploited for air conditioning. If on the other hand quantity $Q_1$ of heat is obtained from a water tank at ambient temperature or below, the cooling action can be exploited to make ice. Heat storage can in this way be coupled with cold production.

The difference in temperature that occurs between the two reaction vessels when the hydrogen flows back from the low-temperature hydride to the active magnesium can also be exploited in a practical way to drive a thermodynamic machine like a Stirling engine, increasing its thermodynamic efficiency (R. F. Boehm, Appl. Energy 23, 281–92 [1986]).

The difference in temperature between the two reaction vessels can also be exploited in a similar way to increase the current efficiency of thermovoltaic cells.

The temperature $T_2'$ at which quantity $Q_2$ of heat is recovered at the high-temperature reservoir end depends primarily on the level of hydrogen pressure prevailing in the system, which is dictated by the hydrogen-dissociation pressure of the low-temperature hydride at that hydride's temperature $T_1'$. The maximum hydrogenation temperature of magnesium is attained at equilibrium and depends solely on the hydrogenation pressure in accordance with the equation $$P_{H_2} \text{ (in bars)} = -4158/T + 7.464.$$

Equilibrium temperature is attained during the stationary conditions of heat recovery.

Under ideally reversible and constant conditions of heat storage and recovery, in accordance with the present method the efficiency of heat storage would be 100% ($T_2' = T_2$ and $T_1' = T_1$). Under actual conditions, however, $T_2'$ will be lower than $T_2$, meaning that there will be energy losses, which can be ascribed to the following factors:

there are no equilibrium conditions, the temperature of the low-temperature reservoir is usually lower during heat recovery than during heat storage ($T_1' < T_1$), there is a hysteresis on the part on the low-temperature hydride, and the hydride-phase plateau slopes in the low-temperature CPI diagram.

Thus, the advantages of the MgH$_2$-Mg system as a heat reservoir—the absence of hysteresis and the almost horizontal plateau of the hydride phase in the CPI diagram—will be especially evident from this aspect.

The heat storage in accordance with the invention can also be accompanied in the present method by raising the stored heat to a higher temperature graduation, meaning that $T_2'$ can be higher than $T_2$, in the sense of a heat transformer. This can be done by raising the temperature of the low-temperature reservoir during heat recovery to above the temperature that occurs during heat storage ($T_1' > T_1$).

At the beginning of heat recovery it is necessary for the MgH$_2$-Mg reservoir to be at a temperature above approximately 150° C. because it is only at such a temperature that charging with hydrogen as well as the "active MgH$_2$-Mg system" can occur rapidly enough. Otherwise, if the high-temperature reservoir has already cooled subsequent to heat storage to a temperature below that temperature, it is necessary only to bring a little of the reservoir material to a temperature above 150° C. The hydrogen reaction will then commence with the reaction enthalpy heating the surrounding particles of magnesium until the overall high-temperature reservoir is above 150° C. and the magnesium can be completely hydrogenated. This "ignition" process can derive from either an electric source of heat or a flame. A solar or thermovoltaic cell, the latter powered by the reaction heat from the magnesium-hydride reservoir, can be the source of current in the case of solar heat storage.

If the magnesium-hydride reservoir is employed only for high-temperature heat storage and not for cooling, it can be practical to eliminate intermediate storage of the hydrogen expelled from the magnesium hydride in the form of a low-temperature hydride. Otherwise, the hydrogen can be stored in an unpressurized gasometer or in a pressurized vessel, with the latter leading to considerable reduction in volume.

An application of intermediate hydrogen storage that is especially cost-effective from the engineering aspect consists of positioning a magnesium-hydride heat reservoir in an existing hydrogen infrastructure like a long-distance hydrogen-supply line. Since such pipelines operate at a pressure of 25 bars, they feature a hydrogen-charging pressure that is outstandingly appropriate for generating heat through magnesium-hydride formation.

A hydrogen-supply system at a pressure of 25 bars for example can on the other hand easily accept hydrogen again due to the hydrogen-dissociation pressure that occurs during the thermal decomposition of the magnesium hydride.

The calorific value of the hydrogen in pipelines or other reservoirs can in this way be increased by the reaction enthalpy of magnesium-hydride formation (approximately ⅓ of the hydrogen calorific value) by supplying solar energy or garbage heat.

In addition to the potential for generating cold by combining MgH$_2$ with a metal alloy that can form a low-temperature metal hydride, the reaction heat of MgH$_2$ formation can also be directly supplied to a conventional absorption refrigerator.

The invention will now be described in the illustrative, non-limiting examples hereinbelow in conjunction with the accompanying drawings wherein.

Figure 1:
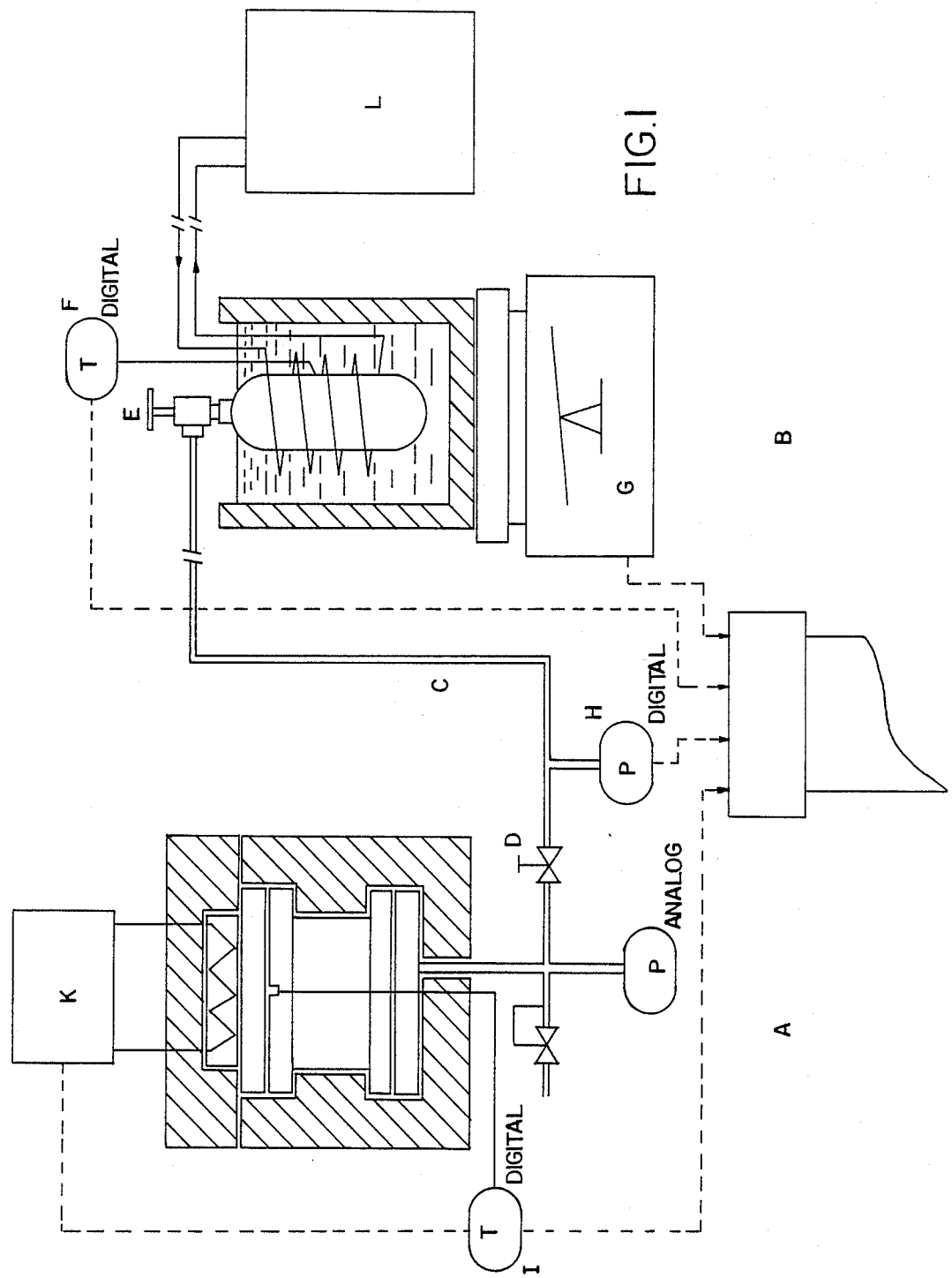
FIG. 1 is a schematic illustration of a system in accordance with the invention.

Referring now more particularly to FIG. 1, the apparatus comprises a high-temperature reservoir A, a low-temperature reservoir B, a line comprising a copper capillary C, shut-off valves D and E, sensors F, G (digital scales), and H, and controls I and K (temperature controls) between the two reservoirs, and sources or consumers of heat (e.g. recirculation thermostat L). P represents pressure, and T temperature, reading digitally or in the form of a manometer, as indicated.

High-temperature reservoir A is a cylindrical, heat-insulated, high-quality steel autoclave (e.g. 70 mm high and with an inside diameter of 180 mm) designed to operate at 25 bars and with an effective volume of 1.41 liters. To ensure satisfactory heat output and hydrogen transport to and from the storage material, the reservoir accommodates an aluminum plate equipped with heat-conducting or hydrogen-conducting rods. For heat storage the reservoir can be heated either with focused sunlight or with an electric hot plate (1500 W). During heat recovery the hot plate is removed to allow the heat to flow out through the lid of the autoclave or exploited for example to heat the water in a pan (for boiling). The reservoir was filled with 1054 g of magnesium powder (U.S. Pat. No. 4,554,152, with 1.5% by weight of nickel—Ni(COD)$_2$—as a doping agent, 270 mesh) to a storage-material density of 0.75 g/cm$^3$ and charged with hydrogen (10 bars at 330° C.). The reversible hydrogen content of the MgH$_2$ after several cycles was 6.4% by weight (72 g H$_2$ = 0.85 m$^3$ H$_2$).

Figure 2:
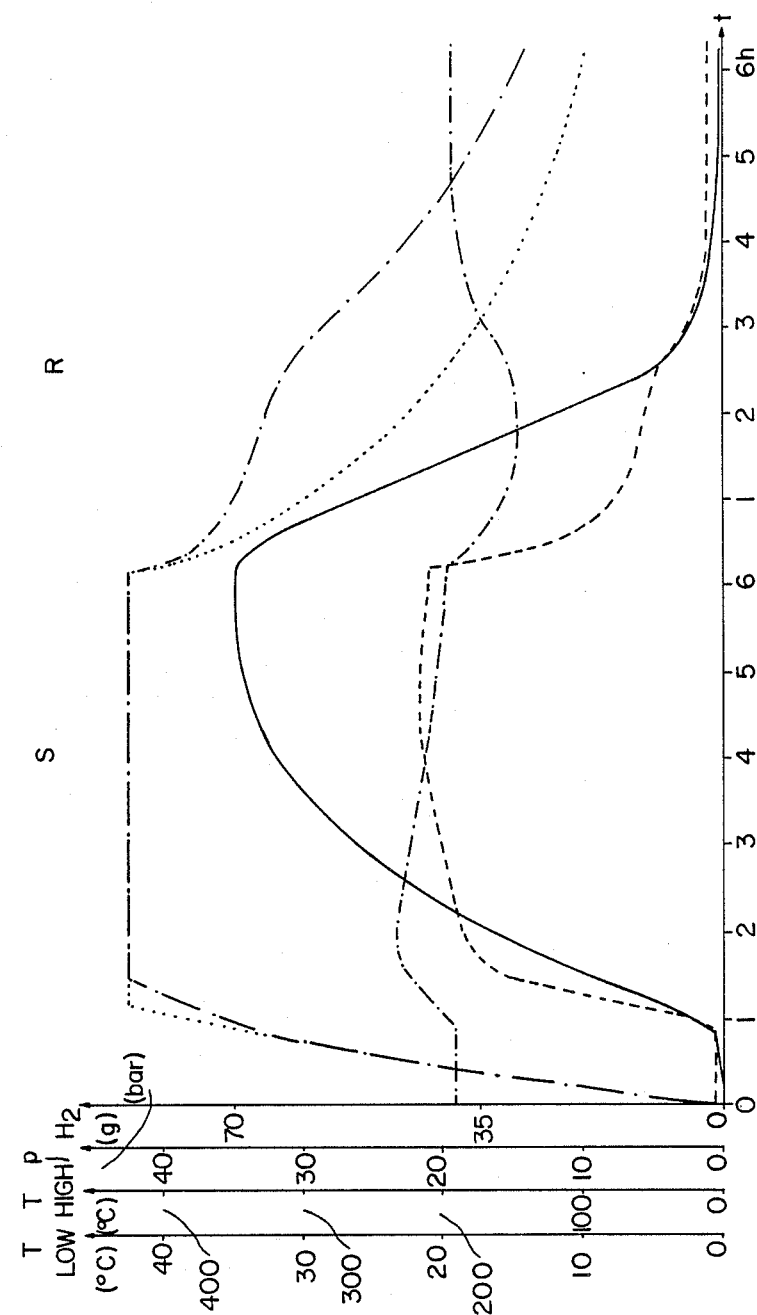
FIG. 2 is a series of pressure and temperature curves for operation of a system according to FIG. 1.
Figure 3:
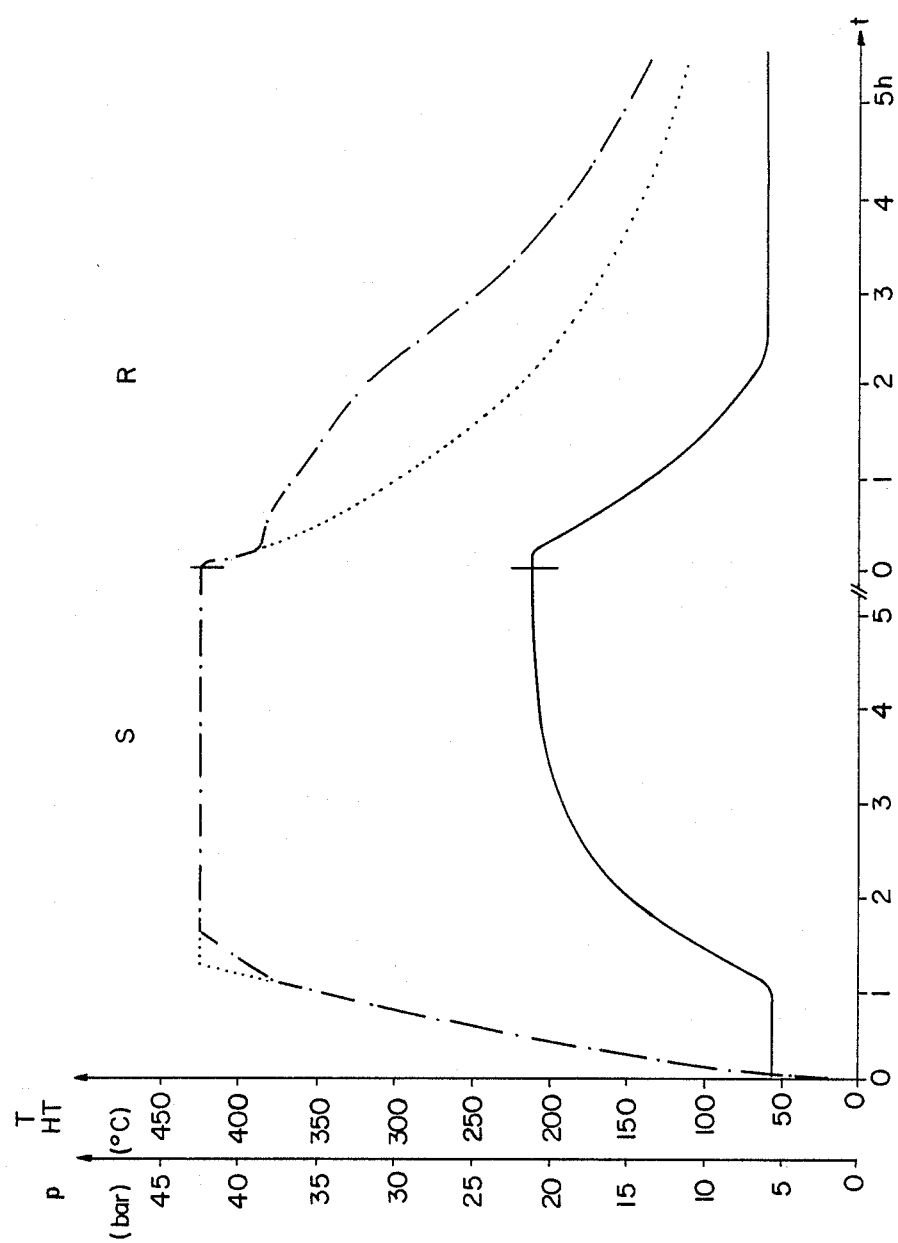
FIG. 3 is a series of pressure and temperature curves for operation of a system according to FIG. 1 wherein the low-temperature reservoir is replaced by a pressurized hydrogen vessel.

Low-temperature reservoir B was a commercial 1 m$^3$ hydride reservoir with 5 kg of Ti$_{0.98}$ Zr$_{0.02}$ V$_{0.43}$ Fe$_{0.09}$ Cr$_{0.05}$ Mn$_{1.55}$800 as a storage material accommodated in a heat container or Dewar flask full of water or a mixture of glysantin and water that could be heated or cooled with a thermostat. The heat container with the low-temperature reservoir was placed on digital scales G (with a weight range of 32 kg and a resolution of 0.1 g) with an analog output allowing variations in weight due to intake and release of hydrogen to be plotted on a chart (the solid curve in FIG. 2). The system hydrogen-pressure ($P_{dig}$ manometer, broken-line curve in FIG. 2 and solid curve in FIG. 3) and the temperatures below the hot plate inside the high-temperature reservoir (dot-and-long-dash curve in FIGS. 2 and 3) and at the outer surface of the low-temperature reservoir (dot-and-short-dash curve in FIG. 2) were also plotted on the chart (with the dotted curves in FIGS. 2 and 3 representing the heating and cooling of the high-temperature reservoir with the shut-off valve closed). The temperature of the high-temperature reservoir was regulated by the hot plate.

EXAMPLE 1

Heat Storage (Range S, FIG. 2)

The high-temperature reservoir was heated from 20° to 425° C. (over 1 hour) and maintained at that temperature for 5 hours (dot-and-short-dash curve, FIG. 2), expelling 69.4 g of hydrogen out of the high-temperature reservoir at a maximum rate of 33.6 g $H_2$/h into the low-temperature reservoir, where it was absorbed (solid curve, FIG. 2). During this process the temperature of thermostat L was maintained at 20° C.

Heat Recovery (Range R, FIG. 2)

The valve was opened, the hot plate removed, and the upper surface of the autoclave exposed immediately upon termination of heat storage, allowing the heat to be released into the environment. With the temperature of the thermostat maintained at 20° C., 60.0 g of hydrogen were absorbed in 2.5 hours and 69.0 g in 6 hours (solid curve, FIG. 2), 86.5 and 99.4% respectively of the hydrogen released during heat storage. (Only 0.4 g more of $H_2$ were absorbed by the high-temperature reservoir during the next 14 hours subject to the same conditions). The heat-storage capacity of the high-temperature reservoir was 0.71 kW-hr in this case, corresponding to an uptake of 69.0 g of $H_2$. The heating capacity of the high-temperature reservoir was, at 0.3 kW, practically constant, determined, that is, solely by the release of heat into the environment, during the first approximately 2.5 hours. The temperature of the high-temperature reservoir during this time ranged from 425° to 300° C. (dot-and-long-dash curve, FIG. 2). The test was repeated 9 times with the same results.

EXAMPLE 2

The test was carried out as described in Example 1 but with the temperature of the thermostat at +10° C.

Heat Storage 69.0 g of hydrogen were absorbed by the low-temperature reservoir in 6 hours at a maximum rate of 40.4 g $H_2$/h.

Heat Recovery 69.0 g of hydrogen were absorbed by the high-temperature reservoir in 6 hours—a heat-storage capacity of 0.71 kW-hr. The heating capacity of the high-temperature reservoir was a practically constant 0.26 kW during the first approximately 2.5 hours. When the high-temperature reservoir was stressed by placing a pot of cold water on the upper lid of the autoclave (for boiling), the capacity of the reservoir increased to 0.52 kW. The test was repeated 8 more times with the same results.

EXAMPLE 3

The test was carried out as described in Example 1 but with the temperature of the thermostat at +30° C.

Heat Storage 60.6 g of hydrogen were absorbed by the low-temperature reservoir in 6 hours at a maximum rate of 26.0 g $H_2$/h.

Heat Recovery 62.6 g of hydrogen were absorbed by the high-temperature reservoir in 6 hours—a heat-storage capacity of 0.65 kW-hr. The heating capacity of the high-temperature reservoir was a practically constant 0.33 kW during the first 2 hours.

EXAMPLE 4

The test was carried out as described in Example 1 but with the temperature of the thermostat at +40° C.

Heat Storage 36.4 g of hydrogen were absorbed by the low-temperature reservoir in 6 hours at a maximum rate of 24.0 g $H_2$/h.

Heat Recovery 37.6 g of hydrogen were absorbed b the high-temperature reservoir in 6 hours—a heat-storage capacity of 0.38 kW-hr. The heating capacity of the high-temperature reservoir was a practically constant 0.33 kW during the first 1.2 hours.

EXAMPLE 5

Heat Storage

Heat storage proceeded as described in Example 1 and led to the same results. Upon termination of heat storage the high-temperature reservoir was allowed to cool to room temperature with the shut-off valve closed.

Heat Recovery

The temperature of the thermostat was maintained at 20° C. and the high-temperature reservoir heated at a rate of 5° C. a minute. Hydrogen began to be absorbed at the high-temperature reservoir end at approximately 150° C. in conjunction with a rapid rise in the temperature of the high-temperature reservoir. The test was repeated with the same results with the temperature of the thermostat maintained at +10° C.

EXAMPLE 6 (ICEMAKING)

Heat Storage

Heat storage proceeded as described in Example 1, although a Dewar flask full of ice water was employed to chill the low-temperature reservoir. 67.2 g of hydrogen were absorbed by the low-temperature reservoir in 3 hours at a maximum rate of 46.0 g $H_2$/h. The high-temperature reservoir was then cooled to 306° C. and the ice water in the Dewer flask replaced with water at 0° C.

Heat Recovery and Cold Generation

The hot plate was removed and the shut-off valve opened. An immediate uptake of hydrogen by the high-temperature reservoir accompanied by a temperature rise of approximately 10° C. was observed. 59.0 g of hydrogen were absorbed by the high-temperature reservoir in 3 h and 2.5 g in another 2 hours, corresponding to a heat-storage capacity of 0.64 kW-hr. The heating capacity of the high-temperature reservoir was an almost constant 0.23 kW during the first 2.3 hours. 1.9 kg of ice formed in the 0° C. water in the Dewar flask during heat recovery, corresponding to cooling capacity of 0.18 kW-hr and yielding a mean cooling output of 0.076 kW. The test was repeated 2 times with the same results.

EXAMPLE 6 (HEAT TRANSFORMATION)

Heat Storage

The high-temperature reservoir was heated from 20° to 349° C. (over 45 minutes) and maintained at that temperature for 23 hours, expelling 76 g $H_2$ out of the high-temperature reservoir and into the low-temperature reservoir, where it was absorbed. During this process the temperature of the coolant in the low-temperature reservoir was maintained at −20° C., attaining a final system pressure of 4.3 bars.

Heat Recovery

Upon termination of heat storage the temperature of the thermostat was raised to and maintained at 29° C. with the shut-off valve closed (at an initial pressure of 24.3 bars). The hot plate was removed and, once the high-temperature reservoir had cooled to 350° C., replaced with a heat-insulating plate. Once the shut-off valve was opened the temperature inside the high-temperature reservoir rose rapidly to 373° C., remained at 373° to 368° C. for 2 hours, and dropped during the next 2 hours to 340° C. 59 g of $H_2$ were absorbed by the high-temperature reservoir during the first 4 hours and 10 g during the next 12 hours. The heat-storage capacity of the high-temperature reservoir was 0.71 kW-hr and its heat output almost a constant 0.15 kW during the first 4 hours. The "heat exploitation" of from 349° C. to 373°-368° C. during the first 2 hours accordingly corresponds to a difference in temperature of 24° to 19° C. The test was repeated with the same results.

EXAMPLE 8

(Heat Storage With the Aid of a Pressurized Hydrogen Vessel)

In this test the low-temperature reservoir was replaced with a 50 l vessel of hydrogen pressurized to 5 bars at +17° C.

Heat Storage (Range S, FIG. 3)

The high-temperature reservoir was heated from 20° to 425° C. (over 1 hour) and maintained at that temperature for 3 hours (dot-and-dash curve, FIG. 3), increasing the pressure of the hydrogen in the vessel to 21.2 bars (solid curve, FIG. 3, corresponding to 69.0 g $H_2$).

Heat Recovery (Range R, FIG. 3)

The hot plate was removed and the temperature of the high-temperature reservoir dropped to 387° C. in 10 minutes (dot-and-dash curve, FIG. 3), at which point the high-temperature reservoir began to absorb hydrogen (solid curve, FIG. 3). In approximately 2.2 Hours (FIG. 3) the hydrogen pressure in the vessel dropped from 21.2 to 5.8 bars and then remained constant, with the temperature of the high-temperature reservoir simultaneously dropping from 387° to 285° C. This pressure drop of 15.4 corresponds to a hydrogen uptake on the part of the high-temperature reservoir of 65 g and to a heat-storage capacity of 0.67 kW-hr. The mean heating output was 0.34 kW.

The test was repeated 4 times with the same result.

It is understood that the specification and examples are illustrative but not limitative of the present invention and that other embodiments within the spirit and scope of the invention will suggest themselves to those skilled in the art.

What is claimed is:

1. A closed system for storing and transforming heat and for generating cold comprising first and second closed containers, a gas-flow line connecting the containers, means for opening and closing the line, in the first container magnesium hydride containing 0 to 10% by weight of nickel and a metal or metal alloy able to form a low temperature dissociable metal hydride in the second container, the low temperature metal having a hydrogen-dissociation pressure which is lower than that of the magnesium hydride during thermal dissociation of the magnesium hydride and which is higher than that of the magnesium hydride during its restoration.

2. A system according to claim 1, wherein the magnesium hydride is active magnesium hydride.

3. A system according to claim 2, wherein the active magnesium hydride is obtained by hydrogenating a magnesium powder with a particle size smaller than 270 mesh.

4. A system according to claim 2, wherein the active magnesium hydride is obtained by hydrogenating magnesium doped with 5 to 16% by weight of nickel.

5. A system according to claim 1, wherein the low temperature dissociable metal is iron-titanium.

6. A system according to claim 1, wherein the low temperature dissociable metal is an alloy of titanium, zirconium, vanadium, iron, chromium and manganese.

7. A system according to claim 6, wherein the metal composition of the alloy on a molar basis is approximately $Ti_{0.98} Zr_{0.02} V_{0.43} Fe_{0.09} Cr_{0.05} Mn_{1.5}$.

8. A system according to claim 1, wherein the low temperature dissociable metal is of the formula $LaNi_{5-x}Al_x$ wherein $0 \leq x \leq 1.5$.

9. A system according to claim 1, wherein the low temperature dissociable metal is of the formula $MmNi_{5-x}Fe_x$ wherein $0 \leq x \leq 1.0$ and Mm is a Mischmetall.

10. A system according to claim 1, including at least one of means for supplying heat to the first container and means for withdrawing heat from the first container.

11. A system according to claim 1, including at least one of means for supplying heat to the second container and means for withdrawing heat from the second container.

12. A method of storing and subsequently releasing heat which comprises providing first and second closed containers with a connecting gas-flow line, providing magnesium metal or hydride to the first container and a low temperature dissociable metal hydride or its metal or metal alloy to the second container, the metal in the first container being present as the hydride, supplying heat to the first container whereby magnesium hydride therein is converted to magnesium and the hydrogen flows to the second container converting the metal therein to the hydride, thereby storing in the second container in the form of the hydride the thermochemical energy imparted to the first container, and thereafter decomposing the hydride in the second container to give off the stored thermochemical energy.

* * * * *